United States Patent [19]

Weis et al.

[11] 4,109,343

[45] Aug. 29, 1978

[54] TROLLEY WHEEL ASSEMBLY

[75] Inventors: Siegfried K. Weis, Grand Rapids; Douglas J. Van der Meulen, Shelbyville, both of Mich.

[73] Assignee: C. L. Frost & Son, Inc., Grand Rapids, Mich.

[21] Appl. No.: 684,552

[22] Filed: May 10, 1976

[51] Int. Cl.² ............................................. E05D 13/02
[52] U.S. Cl. ........................................ 16/98; 301/5.7; 308/236; 29/148.4 A
[58] Field of Search .............. 16/98, 46; 301/5.7, 301/63 DS, 63 PW; 308/16, 190, 35, 191, 205, 208, 210, 196, 236; 29/148.4 R, 148.4 A; 46/221; 74/432

[56] References Cited

U.S. PATENT DOCUMENTS

| | | | |
|---|---|---|---|
| 2,628,869 | 2/1953 | Whitcomb, Jr. | 308/236 X |
| 3,521,342 | 7/1970 | Van Dorn et al. | 308/236 X |
| 3,532,402 | 10/1970 | Beery et al. | 308/236 |
| 3,815,959 | 6/1974 | Hill | 301/63 PW |
| 3,885,840 | 5/1975 | Neder | 308/236 X |
| 3,905,649 | 9/1975 | Kosono et al. | 301/5.7 |
| 3,937,541 | 2/1976 | Alling et al. | 29/148.4 A X |

FOREIGN PATENT DOCUMENTS

| | | | |
|---|---|---|---|
| 1,057,931 | 5/1959 | Fed. Rep. of Germany | 301/5.7 |
| 1,073,364 | 1/1960 | Fed. Rep. of Germany | 301/5.7 |

*Primary Examiner*—Dave W. Arola
*Assistant Examiner*—Moshe I. Cohen
*Attorney, Agent, or Firm*—Price, Heneveld, Huizenga & Cooper

[57] ABSTRACT

An improved trolley wheel assembly and method therefor. The assembly is useful in conveyor applications especially where sanitary conditions must be maintained such as in the food processing industry. The assembly has high load bearing capabilities and includes an anti-friction plastic wheel extending about a pair of annular, metallic outer bearing race rings positioned back to back within a central opening of the wheel. The wheel extends around edges of the rings to maintain their axial positions and extends into recesses in the rings to prevent wear-producing rotation between the rings and wheel. The method includes prepositioning the rings in back-to-back alignment and placing or forming by molding the wheel therearound.

19 Claims, 11 Drawing Figures

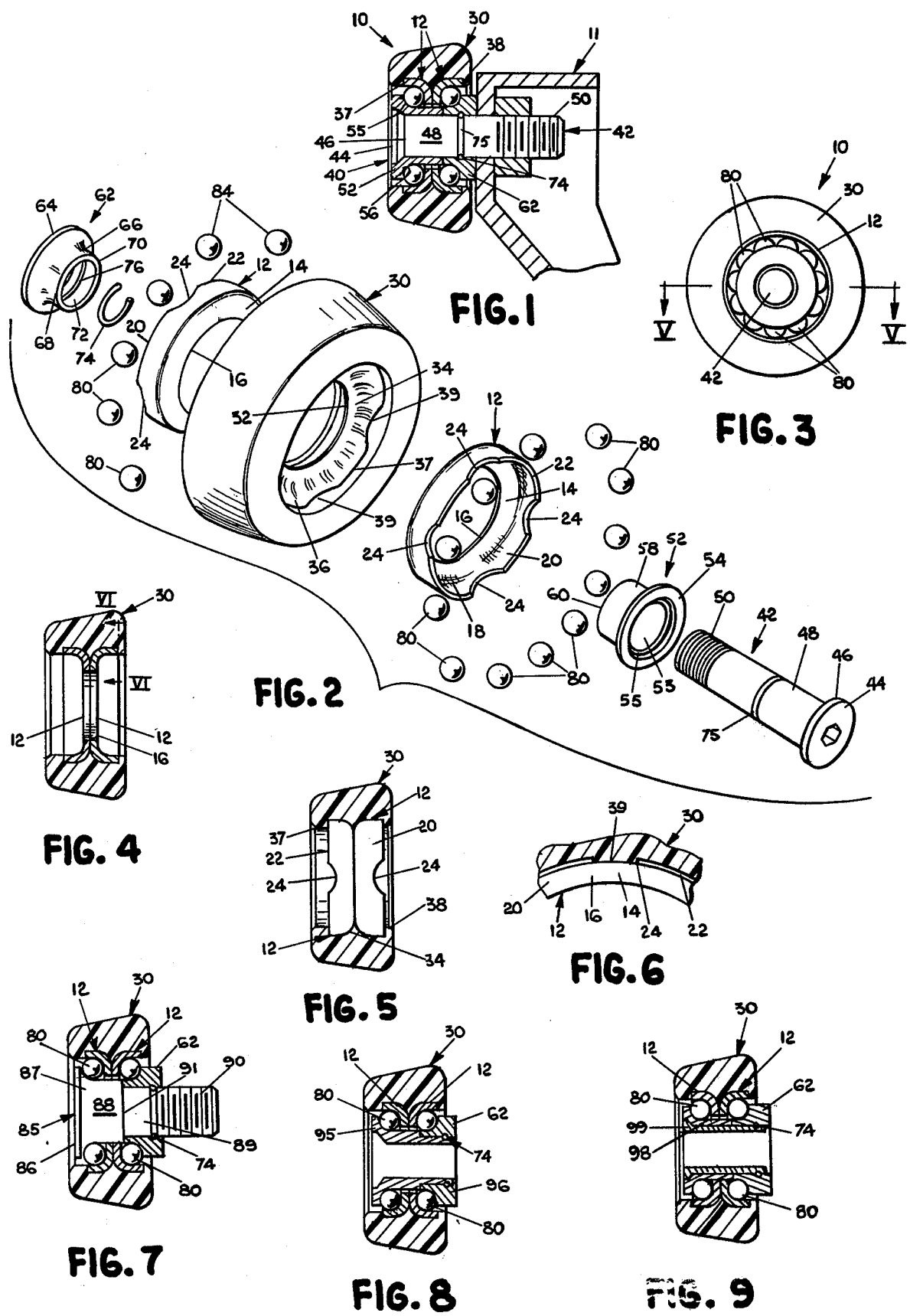

TROLLEY WHEEL ASSEMBLY

BACKGROUND OF THE INVENTION

This invention relates to trolley wheels and, more particularly, to an improved trolley wheel which has a higher load bearing capacity and is longer wearing and more durable, as well as to a method for making the improved trolley wheel which avoids previous manufacturing difficulties and expense.

Trolley wheels have long been used in many industries, especially in overhead and other conveyors. Such wheels typically support suspended brackets which transport goods through various processes. For many years, metal trolley wheels were used and were subject to wear, corrosion, deterioration and were also noisy in operation.

More recently, combination metal and plastic trolley wheel assemblies have been devised which have greatly advanced the industry because of their many advantages. One such trolley wheel is that disclosed in copending, commonly assigned United States patent application Ser. No. 528,794, filed Dec. 2, 1974, entitled *SANITARY ANTIFRICTION TROLLEY WHEEL* invented by Frederick R. Sytsma. This trolley wheel essentially utilizes a pair of metallic outer bearing race rings fitted adjacent a central opening in an antifriction plastic trolley wheel with an inner race assembly extending through the opening and a pair of full complement rows of antifriction ball bearings between the inner and outer races. The outer race rings were spaced apart in a predetermined spacing by a portion of the plastic wheel.

A difficulty which has been encountered with such prior wheels is that the portion of the wheel which spaced the outer race rings apart is critical to the spacing of the bearings and thus the proper functioning of the trolley wheel assembly. Because of material shrinkage during manufacture of the wheels, it was difficult to obtain the critical dimensioning necessary for the wheel, and especially the portion intermediate the outer races, prior to insertion of the outer race rings therein.

Another difficulty encountered during use was that of the rotation of the outer metallic bearing race rings with respect to the antifriction plastic wheel. Such rings were also difficult to maintain in axial alignment with the wheel. Rotation of the rings with respect to the wheel causes heat buildup and wear reducing the life of the wheel. Excessive wear throws the bearings out of alignement.

Also, prior outer race ring configurations have required drawing of a portion of the rings meaning that the material used had to be sufficiently ductile to allow that drawing. Incorporation of sufficient ductility in the metallic material prevented the use of harder, longer-wearing materials and limited the load capabilities of the assembly.

Therefore, a need has existed for an improved trolley wheel assembly which maintains the advantages of the more recently designed metal-plastic trolley wheel assemblies useful in sanitary, overhead conveyor applications and yet overcomes the above-mentioned problems of manufacture, maintenance, and use.

SUMMARY OF THE INVENTION

Accordingly, the present invention provides an improved trolley wheel assembly which is easier to manufacture, has a higher load capacity than prior known assemblies, and yet maintains the advantages of certain prior known assemblies. The invention is extremely useful in conveyor applications, especially those applications requiring sanitary conditions and frequent steam cleaning or the like such as in the food processing industry where the assemblies must be subjected to high heat and moisture conditions and sustained use without corrosion, deterioration, or breakdown.

In its broader aspects, the invention is a trolley wheel assembly comprising an antifriction plastic trolley wheel having a central opening with an axis therethrough, a pair of annular, metallic, outer bearing races positioned back to back in abutment with one another in said central opening, each of the outer bearing races including a contoured portion adapted to receive antifriction bearing means for rotational support of the wheel and outer races and recess means for preventing rotation of the outer bearing race with respect to the wheel. The plastic wheel also includes engaging means engaging the recessed means on the outer bearing races to prevent rotation between the wheel and races as well as to prevent axial movement of the outer races away from the back-to-back position. Axially extending means may be provided in the central opening having a pair of inner raceways in registry with the contoured portions of the outer bearing races as well as antifriction bearing means disposed between each of the outer bearing races and inner raceways for rotational support of the wheel and outer races.

In more detailed aspects of the wheel assembly, the plastic wheel is molded about the outer races and includes portions extending over the axial outermost and surfaces of the outer bearing races to hold them in back-to-back position, the wheel also including integral portions extending into scallops formed in axially extending flanges of the outer bearing races to prevent the races from rotating with respect to the wheel.

A method for manufacturing an antifriction trolley wheel is also disclosed which provides an easier, simpler method than has been heretofore known. A pair of annular, metallic outer bearing race rings is provided including a contoured portion adapted to receive bearing means and recess means for preventing rotation of the races with respect to the wheel. The races are positioned in engagement with one another with the contoured portions in axial alignement and a plastic wheel is positioned around the races such that the wheel contacts the radially outermost surfaces of the races for support. The wheel fills any gaps or spaces between the outer races but does not separate them, contacts the recess means in the outer races to prevent rotation about the races and wheel, and extends axially beyond at least a portion of the outer races to retain them in their axially aligned positions.

The present assembly and method avoids the difficulties of critical dimensioning of portions of a plastic wheel spacing outer races apart because the races are prepositioned in engagement with one another and the wheel is positioned therearound by molding or otherwise. The assembly is very durable and is long wearing because rotation between the outer race rings and plastic wheel is prevented by the recess means while the proper alignment of the bearings is ensured because of the axial retention of the races in engagement with one another by portions of the wheel. A higher load capacity is obtained in the assembly because the configuration of the outer bearing races eliminates drawing during manufacture allowing the use of hardened materials. In addition to all the above advantages, the assembly maintains the other advantages of usefulness in sanitary conveyor applications such as the food processing industry where the assemblies must be steam cleaned frequently and thus subjected to a high heat and moisture all without corroding, flaking, or chipping or other deterioration which could contaminate food being carried by such assemblies.

These and other objects, advantages, purposes, and features of the invention will become more apparent from a study of the following description taken in conjunction with the drawings.

BRIEF DESCRIPTION OF THE DRAWINGS

FIG. 1 is a fragmentary, sectional view of one embodiment of the improved trolley wheel assembly of the present invention secured to the upper end of a typical overhead conveyor trolley bracket;

FIG. 2 is an exploded, perspective view of the trolley wheel assembly shown in FIG. 1;

FIG. 3 is an end view of the trolley wheel assembly shown in FIGS. 1 and 2;

FIG. 4 is a sectional view of the trolley wheel and outer race rings, without the remainder of the assembly, illustrating the positions of the outer race rings in the plastic wheel;

FIG. 5 is a sectional view of the trolley wheel without the remainder of the assembly taken along line V—V of FIG. 3;

FIG. 6 is a fragmentary, sectional view of the axial end surface of one of the outer race rings and the interengagement of wheel and outer bearing race taken along the plane VI—VI of FIG. 4;

FIG. 7 is a sectional view of the trolley wheel of the present invention assembled with another embodiment of the axial inner race assembly;

FIG. 8 is a sectional view of the trolley wheel of the present invention assembled with yet another embodiment of the axial inner race assembly;

FIG. 9 is a sectional view of the present invention shown assembled with a fourth embodiment of the axial inner race assembly;

DESCRIPTION OF THE PREFERRED EMBODIMENTS

Figure 10:
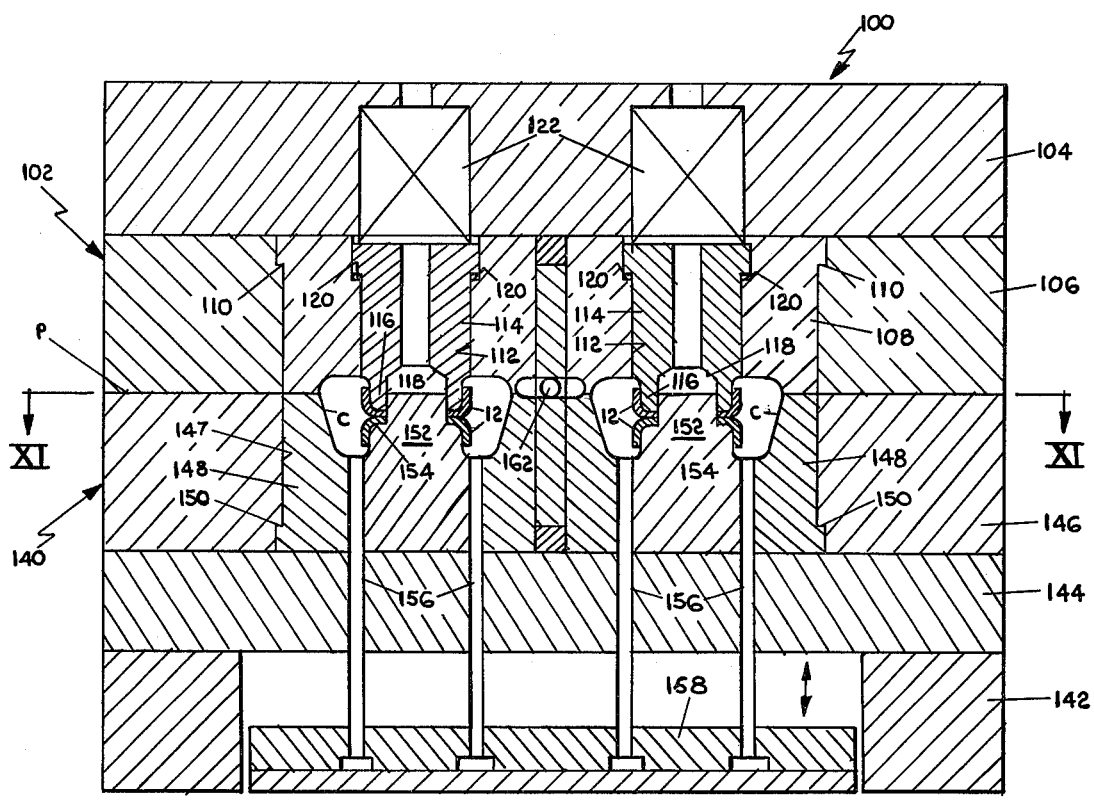
FIG. 10 is a sectional view of the injection molding apparatus preferably used to manufacture the present trolley wheel.

Referring now to the drawings in greater detail, FIGS. 1—3 illustrate the preferred embodiment 10 of the trolley wheel assembly of the present invention including a pair of identical, annular, metallic outer bearing races 12, a plastic, antifriction trolley wheel 30 positioned about rings 12, and an axially extending, multipiece inner race assembly 40 extending through the wheel-outer race combination. A pair of full complement rows of antifriction ball bearings 80 are positioned between the axially and radially aligned outer races and inner raceways to rotationally support the wheel and outer race unit about the multipiece inner race assembly.

As shown in FIG. 1, the assembly 10 is designed for incorporation and support on a trolley bracket 11 at its upper end such that the bracket is suspended from the wheel assembly. The wheel itself includes a sloped or angled outer circumferential surface on wheel 30 in order to accommodate the sloped surfaces of the lower flange of a conventional I-beam which is commonly used in overhead conveyor applications. Bracket 11 extends on one open side of the I-beam with another bracket 11 and wheel assembly on the opposite side of the I-beam. The two brackets are secured together to hold the wheels in alignment with the beam for movement therealong.

As is best seen in FIGS. 1 and 2, annular, metallic, outer bearing races 12 are utilized in pairs within a single wheel 30. Each of the rings 12 is preferably stamped from precipitation hardened, stainless steel to provide a durable, long-lasting support surface for the rows of ball bearings 80. Each race ring 12 includes a radially extending annular flange 14 having a circular central opening or aperture 16 therethrough. Radial flange 14 merges integrally through a curved transition area 18 into an axially extending, annular flange 20 having an axially outermost radially directed end surface 22 lying in one plane. The curved transition area 18 has the cross-sectional shape of a portion of a circle to match the spherical contour of the ball bearings 80 which are received therein as shown in FIG. 1. The outer axial edge 22 of the axially extending flange 20 of each ring also includes preferably four equally spaced, curved or arcuate scallops or recesses 24 extending thereinto. Recesses or scallops 24 mate with and are tightly engaged by correspondingly shaped portions of plastic wheel 30 to both prevent rotation between the race rings 12 and wheel 30 as well as to prevent axial movement and/or separation of rings 12 when in place within the wheel.

As shown in FIGS. 1-3, plastic antifriction trolley wheel 30 receives rings 12 in an engaged, back-to-back relationship within a central opening 32. Radial flanges 14 engage one another while axial flanges 20 extend away from one another. Although wheel 30 is shown as a separately manufactured part in FIG. 2, in actual manufacture, wheel 30 is injection molded about a pair of the aligned, prepositioned rings 12 in the manner shown in FIGS. 10 and 11. However, it is possible that the wheel could be separately molded apart from the rings and the rings thereafter assembled to the wheel assuming the wheel material had sufficient flexibility to allow insertion of the rings such that portions of the wheel could engage the recesses 24 and the axial outer end surface 22 of axial flange 20.

In either case, whether performed or formed by molding about the prepositioned rings, wheel 30 includes an annular, generally V-shaped cross sectional portion 34 which fits between the contoured backs 18 of the engaged rings 12 to fully support those rings without separating them. Also included on either side of the central portion 34 are contoured areas 36 matching the curvature of the outside radially outermost surface of the rings 12 as well as radially extending annular flanges 37, 38 on either axial end of the wheel 30. Radial flanges 37, 38 extend over axial end surfaces 22 of rings 12 to tightly engage the same to maintain the axial positions of the rings and include axially extending, curved protrusions 39 which are generally parallel to the axis of wheel 30 as are recesses 24 and mate with recesses 24 to prevent rotation between the wheel and rings. The radially innermost surfaces of flanges 37, 38 and protrusions 39 are coterminous and flush with the inner surface of axial flanges 39 of rings 12 to prevent any interference with the bearings 80 (FIGS. 1, 4, and 6).

Preferably, wheel or tire 30 is formed from a thermoplastic material such as an acetal resin sold under the trademark "Delrin" by I. E. DuPont de Nemours and Company. This material may be easily injection molded as will be hereinafter described and cools to form a durable, wear resistant, high load bearing wheel which is friction resistant and easily movable especially in conveyor applications. The material has sufficient strength to hold the race rings 12 in their proper engaged position and is virtually noiseless in operation when in contact with a conventional metallic I-beam.

As is best seen in FIGS. 1-3, the axially extending inner race assembly 40, which is preferably entirely formed from stainless steel, includes a solid shaft 42 having an enlarged outer head portion 44 which tapers inwardly at section 46 to a generally constant diameter cylindrical shank portion 48. The outer free end of shaft 48 is threaded at 50 for receipt of a nut to secure the shaft, and thus the entire wheel assembly, to bracket 11 (FIG. 1).

Received over shaft 48 and in abutment with head 44 and tapered section 46 is a second, hollow, inner race member 52 including a first, enlarged outer diameter portion 54 and a curved, concave surface 56 forming an inner raceway which is complementary to the contour of the spherical ball bearings 80 and has the same radius of curvature as the contoured section 18 of outer race rings 12. Raceway 56 merges with a constant diameter cylindrical portion 58 ending in radial end surface 60. Member 52 has an inside surface 53 having a diameter which matches the outside diameter of shaft 48 and includes an enlarged, tapered opening 55 abutting and engaging correspondingly shaped enlarged head 44 to prevent movement of member 52 past head 44.

A third, hollow, generally cylindrical shaped member 62 includes an enlarged outer diameter portion 64 curving inwardly in a contoured raceway 66 matched to ball bearings 80 to a reduced diameter portion 68 ending in a radially directed shoulder or end surface 70. Member 62 is fitted over shaft 48 into abutment with end surface 60 of member 52 and has an inner surface 72 having a diameter matched to shaft 48.

Inner race members 52, 62 are retained on member 42 by a retainer assembly including a split, resilient retainer clip 74 fitted in registering grooves 75, 76 formed respectively on the outside and inside diameters of shaft 48 and inner race member 62. One of the grooves 75, 76 is slightly wider than the clip 74 such that slight axial movement may be obtained between member 62 and shaft 48 to allow member 52 to be tightened securely against shoulder 60 which, in turn, forces member 52 against head 44 such that the inner race members function together as a unit without rotation therebetween. The width of member 62 is sufficient to project beyond the outer surface or axial side of wheel 30 when assembled in the wheel (FIG. 1). This allows bracket 11 or another abutment to engage member 62 to force it tightly against shoulder 60 of member 52. In addition, at least one of the grooves 75, 76 is sufficiently deep to receive the entirety of the resilient clip 65 after member 52 is on shaft 48 and member 62 is forced over clip 65 on shaft 48.

The structure of multipiece inner race assembly 40 is in accordance with the multipiece race assemblies described and claimed in copending, commonly assigned United States Pat. No. 4,039,233, entitled *CONNECTION APPARATUS FOR MULTIPIECE BEARING RACE* and invented by Devere W. Schmidt, the disclosure of which is hereby incorporated by reference herein.

Referring now to FIGS. 7-9, alternative embodiments of the axially extending inner race assembly are illustrated which may all be used with the present improved torlley wheel structure. All of the alternate inner race assemblies are preferably formed from stainless steel and utilize split, resilient, retainer clips 74 seated in grooves having dimensional characteristics allowing assembly with the clip in place on one of the members and slight axial movement of the inner race pieces with respect to one another after assembly to ensure proper tightening of the members to function as a unit in accordance with the concepts disclosed in copending, commonly assigned United States Pat. No. 4,039,233, mentioned above.

In FIG. 7, a solid shaft 85 having an enlarged head 86 curving through a contoured, inner raceway section 87 matched to the spherical shape of the balls 80 to a constant diameter section 88 is inserted through the opening 16 of the bearing ring 12. A coaxial cylindrical extension 89 extends from the end surface of cylinder 88 and is threaded at 90. A second inner race member exactly similar to member 62 described above is fitted over shaft 89 into abutment with the axial end surface 91 of cylinder portion 88 and is retained on shaft 89 by a resilient clip 74 in the manner described above.

In FIG. 8, the inner race assembly includes a bushing 95 having an outer surface having the same shape and contour as solid stud 85 shown in FIG. 7 except that member 95 is hollow and adapted to receive a stud or shaft such as 42 shown in FIG. f2. Member 95 includes a reduced diameter, cylindrical surface 96 which receives an inner race member 62 as described in connection with FIGS. 7 and 2. Member 62 is retained on surface 96 by a resilient spring clip 74 in the manner described above while member 62 projects slightly beyond the end of member 96 and the side of wheel 30 to allow the two members to be forced tightly together by an abutment or bracket.

In FIG. 9, a three-piece inner race assembly extends through opening 16 of rings 12. This assembly is similar to that shown in FIG. 8 except that two, headed bushings 98, 99 are used in place of the solid bushing 95 shown in FIG. 8. Member 62 abuts the end surface of member 98 and forces the same against the headed end of member 99 to retain all members tightly together while the resilient spring clip 74 is engaged between members 99 and 62 to retain the assembly together. In either FIG. 8 or FIG. 9, a separate axle or support shaft may be inserted through the inner diameter of the inner bushing for support of the assembly in the desired fashion.

DESCRIPTION OF THE PREFERRED METHOD AND APPARATUS THEREFOR

Figure 11:
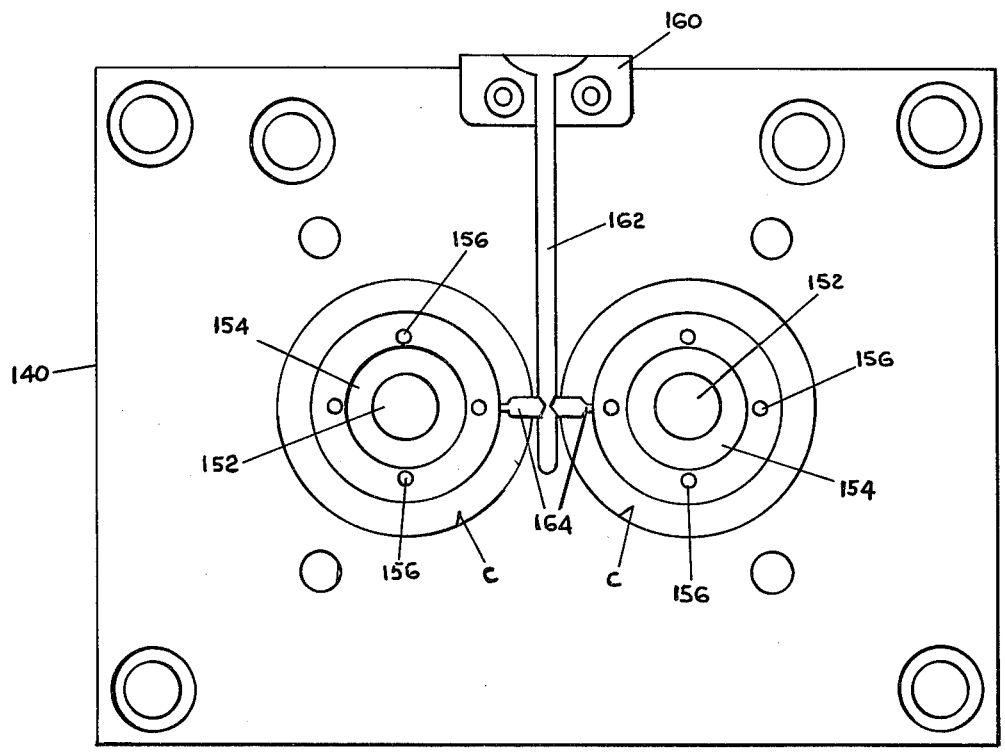
FIG. 11 is a plan view of the lower one-half of the injection molding apparatus taken along the parting line and plane XI—XI of FIG. 10.

Referring now to FIGS. 10 and 11, the preferred method and apparatus for making the improved trolley wheel shown and described in FIGS. 1-9 is illustrated. The wheel is preferably injection molded in a mold apparatus 100 which includes an upper movable mold section 102 and a lower fixed mold section 140. Sections 102, 140 meet and engage one anothr along parting line P as shown in FIG. 10. Upper mold section 102 includes an upper plate 104 secured by conventional securing means or welding to a lower plate 106. Received within lower plate 106 is a central cavity plate or block 108 held against upper plate 104 by shoulders 110. Received within a pair of central openings 112 in cavity block 108 are reciprocal cylindrical mold projections or members 114 having a hollow, cylindrical, contoured end portion 16 and a central, cylindrical recess 118 therewithin. Reciprocal molding members 114 are biased downwardly by springs 122 seated in upper plate 104 which engage the upper surfaces of members 114, which members are limited in downward movement by shoulders 120. The upper portion of the contoured mold cavity C is formed in central plate or block 108 with reciprocal members 114 being moved downwardly therethrough to help form the mold cavity and preposition the outer race rings 112 as will be described below.

Lower mold section 140 includes a base plate 142 secured against a central plate 144 which in turn is secured to an upper plate 146 having a central opening 147 therewithin receiving lower cavity block 148 secured against plate 144 by means of shoulders 150. Cavity block 148 includes the lower portions of mold cavities C formed therein and upstanding cylindrical posts 152 in the center of each of the lower mold portions. Posts 152 include contoured shoulders 154 which match the contour of contoured portions 18 of outer race rings 12 which will be fitted thereover during the manufacturing method. The upper end of post 152 matches the diameter of recess 118 in reciprocable, biased, mold member 114.

A plurality of ejection rods 156 secured to a reciprocal ejection plate 158 are inserted through aligned passageways or apertures extending through plates 144 and blocks 148 into cavities C. The ends of rods 156 are flush with the bottoms of the cavities when withdrawn but may be reciprocated upwardly to eject the molded wheel assembly out of cavity C via plate 158 after the molding process.

To form the wheels, upper mold portion 102 is withdrawn from lower portion 140 along the parting line. A pair of outer race rings 12 is inserted over post 152 in axially aligned, back-to-back fashion such that contoured portion 18 of the lowermost ring engages shoulders 154 of the central posts. Thereafter, the upper mold portion 102 is lowered into alignment and engagement with the lower mold portion 140 such that contoured portions 116 are received in contoured portions 18 of the uppermost outer race ring seated on posts 152. Posts 152 engage recesses 118 to axially align the posts and the reciprocable mold members 114. Springs 122 bias members 114 downwardly to hold the race rings tightly together during molding. Thereafter, molten plastic, preferably acetal resin as described above, in a flowable, heated condition is injected under pressure through a nozzle 160 and sprue passageways 162, 164 (FIG. 11) into each of the mold cavities until the same are filled. The injected, molten plastic is allowed to cool, set up and solidify to retain the rings in their prepositioned locations before ejection rods 156 are reciprocated via plate 158 to eject the formed wheels when mold top portion 102 is raised.

As will be seen in FIG. 10, the plastic is tightly molded about rings 12 to form portions 34 generally intermediate the backs of the rings for firm support as well as flanges 57, 38 which are flush with the inside ball bearing contacting surfaces of the rings in the manner described above. This method eliminates the necessity for critically dimensioning any central portion of a wheel prior to assembly of the rings thereto and also tightly secures the rings against one another such that they are retained in proper axial and radial alignment and engagement throughout the life of the wheel.

Of course, it is possible to mold a wheel from a flexible, resilient plastic rubber or other material which could be flexibly positioned about a pair of prepositioned rings without the rings being molded integrally therewithin by prepositioning in a mold cavity C as mentioned above. In such case, to form the wheel 30 alone, the configuration of central, upstanding mold post 152 would be changed accordingly, as would the lower end 116 of reciprocal mold member 114 in order to properly mold portions 32, 34, 36 of the wheel for receipt of the rings.

Accordingly, the present invention provides an improved trolley wheel assembly which maintains the advantages of a plastic-metallic wheel assembly for use in sanitary conveyor applications and yet improves the load bearing, wear, durability, and manufacturing ease of the assembly. While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. An antifriction trolley wheel assembly comprising a plastic trolley wheel having a central opening with an axis therethrough; a pair of annular, metallic, outer bearing races positioned back to back with one another in said central opening; said outer bearing races each including an outer surface having an annular, axially inward facing portion, an annular, contoured inner surface portion adapted to receive antifriction bearing means for rotational support of said wheel and outer races, an annular, outer end surface facing axially in a direction opposite to said axially inward facing portion of said outer surface and recessed means positioned axially outwardly of said contoured inner surface for preventing rotation of said outer bearing race with respect to said wheel; said annular, axially inward facing surfaces of said outer races directly contacting and abuttingly engaging one another in said back to back position; said central opening including a central portion having a V-like cross-sectional shape engaging the remainder of said outer surfaces of said outer races except for said abuttingly engaged, annular, axially inward facing surfaces; engaging means on said wheel engaging said outer bearing races including first portions engaging said recessed means for each of said outer bearing races to prevent such rotation and second portions engaging said annular, outer end surfaces of said outer bearing races to prevent axial movement of said outer races away from said back to back position, said engaging means retaining said annular, axially inward facing outer race surfaces in engagement with one another and the remainder of said outer surfaces against said central opening surfaces; axially extending means in said central opening having a pair of inner raceways in registry with the contoured portions of said outer bearing races; and antifriction bearing means disposed between each of said outer bearing races and inner raceways for rotationally supporting said wheel and outer races.

2. The trolley wheel assembly of claim 1 wherein said recessed means on said outer bearing races and said first portions of said engaging means extend parallel to said axis.

3. The trolley wheel assembly of claim 2 including an axially extending, annular flange on each of said outer bearing races, said annular flanges extending away from one another; said second portions of said engaging means including a radially extending, annular flange abutting the end surface of each of said axial, annular, outer race flanges.

4. The trolley wheel assembly of claim 3 wherein said outer bearing races each include an annular, radially extending flange integral with and generally at right angles to said annular, axial flanges, said radial outer race flanges including said axially inward facing surfaces and being generally parallel to and abutting one another back to back, said annular, contoured surface portions of said outer races each including portions of said annular, radial and axial flanges and a curved, annular transition area therebetween.

5. The trolley wheel assembly of claim 4 wherein said contoured surface portions of said outer races include inside surfaces engaging said antifriction bearing means; said annular, radially extending flanges of said second portions of said engaging means being coterminous and flush with said inside surfaces of said annular, axially extending outer race flanges.

6. The trolley wheel assembly of claim 5 wherein said recessed means includes at least one scallop recessed in the edge of each of said annular, axially extending flanges of said outer bearing races; said annular, radially extending flanges of said second portions of said engaging means each having said first portions of said engaging means including an axially extending protrusion extending into and mating with said scallop.

7. The trolley wheel assembly of claim 1 wherein said recessed means include an axially extending recess in each of said outer bearing races; said first portions of said engaging means including axial protrusions extending into and mating with recesses in said outer races.

8. The trolley wheel assembly of claim 7 wherein said second portions of said engaging means include annular, radially extending flanges engaging said annular, outer end surfaces of said outer races, which outer end surfaces lie in radially extending planes, said axial protrusions and radially extending flanges of said engaging means being flush with the surfaces of said outer races which engage said antifriction bearing means.

9. The trolley wheel assembly of claim 1 wherein said wheel is molded about said outer bearing races which are prepositioned in said back to back relationship.

10. The trolley wheel assembly of claim 9 wherein said recessed means include an axially extending recess in each of said outer bearing races; said first portions of said engaging means including axial protrusions extending into and mating with said recesses in said outer races.

11. The trolley wheel assembly of claim 1 wherein said axially extending means include a multipiece inner race assembly having separate, contoured, inner race means for forming the inner raceways in registry with said contoured outer race portions.

12. The trolley wheel assembly of claim 11 including retaining means for retaining said inner race means together including means allowing axial movement therebetween whereby said inner race means may be tightened together.

13. An antifriction trolley wheel assembly comprising a plastic trolley wheel having a central opening with an axis therethrough; a pair of annular, metallic, outer bearing races each including an annular, radially extending flange, an annular axially extending flange having an annular, axial end surface, and a curved transition area between said flanges forming a contoured area for receiving bearing means; said outer races being positioned back to back in said central opening with said radial flanges being parallel to and abutting one another and said axial flanges extending away from each other such that said contoured areas face away from one another; said outer races each further including recessed means for preventing rotation of said outer bearing race with respect to said wheel, said recessed means including at least one recessed area within said axial end surface of said annular, axially extending flange of each outer bearing race; said wheel including engaging means formed in one piece therewith and extending axially into, engaging, and filling said recessed means including said recessed area of each of said outer bearing races to prevent such rotation and engaging the entirety of said annular, axial end surface of each of said outer bearing races to prevent axial movement of said outer races away from said back to back position; axially extending means in said central opening having a pair of inner raceways in registry with the contoured portions of said outer bearing races; and antifriction bearing means disposed between each of said outer bearing races and inner raceways for rotationally supporting said wheel and outer races.

14. The trolley wheel assembly of claim 13 wherein said engaging means include radially extending flanges abutting said annular, axial end surfaces of said axially extending outer race flanges.

15. The trolley wheel assembly of claim 14 wherein said recessed area is a scallop recessed in the edge of each of said axially extending flanges of said outer bearing races; said radially extending flanges of said engaging means each including an axially extending protrusion extending into and mating with said scallop.

16. The trolley wheel assembly of claim 15 wherein said axially extending protrusions and radially extending flanges of said engaging means are each coterminous and flush with the inside, antifriction bearing means engaging surfaces of said outer bearing races.

17. The trolley wheel assembly of claim 16 wherein said plastic wheel is molded about said outer bearing races which are prepositioned and held in said back-to-back position during molding.

18. The trolley wheel assembly of claim 17 wherein sais plastic wheel is formed from a thermoplastic material such as an acetal resin; said outer races and axial means including said inner raceways being formed from stainless steel.

19. A trolley wheel assembly comprising a plastic trolley wheel having a central opening with an axis therethrough; a pair of annular, metallic outer bearing races positioned back to back in abutment with one another in said cental opening; said outer bearing races each including an outer surface having an axially inward facing portion, a contoured inner surface portion adapted to receive antifriction bearing means for rotational support of said wheel and outer races, an outer end surface facing axially in the opposite direction to said axially inward facing portion of said outer surface and recessed means positioned axially outwardly of said contoured inner surface for preventing rotation of said outer bearing race with respect to said wheel; said axially inward facing surfaces of said outer races directly contacting and abuttingly engaging one another in said back to back position; said central opening including a central portion having a V-like cross-sectional shape engaging the remainder of said outer surfaces of said outer races except for said abuttingly engaged, axially inward facing surfaces; engaging means on said wheel engaging said outer bearing races including first portions engaging said recessed means of each of said outer bearing races to prevent such rotation and second portions engaging said outer end surfaces of said outer bearing races to prevent axial movement of said outer races away from said back to back position, said engaging means retaining said annular, axially inward facing outer race surfaces in engagement with one another and the remainder of said outer surfaces against said central opening surfaces.

* * * * *

UNITED STATES PATENT AND TRADEMARK OFFICE
CERTIFICATE OF CORRECTION

PATENT NO. : 4,109,343

DATED : August 29, 1978

INVENTOR(S) : SIEGFRIED K. WEIS ET AL.

It is certified that error appears in the above-identified patent and that said Letters Patent are hereby corrected as shown below:

Column 2, Line 44:

"the" second occurrence should be -- a --.

Column 2, Line 52:

"about" should be --between--.

Column 4, Line 67:

"39" should be --20--.

Column 6, Line 6:

"torlley" should be --trolley--.

Column 6, Line 32:

"f2" should be --2--.

Column 6, Line 38:

"96" should be --95--.

UNITED STATES PATENT AND TRADEMARK OFFICE
CERTIFICATE OF CORRECTION

PATENT NO. : 4,109,343

DATED : August 29, 1978

INVENTOR(S) : SIEGFRIED K. WEIS ET AL.

It is certified that error appears in the above–identified patent and that said Letters Patent are hereby corrected as shown below:

Column 6, Line 63:

"anothr" should be --another--.

Column 7, Line 63:

"57" should be --37--.

Signed and Sealed this

Nineteenth Day of June 1979

[SEAL]

Attest:

RUTH C. MASON
Attesting Officer

DONALD W. BANNER
Commissioner of Patents and Trademarks